United States Patent
Kulkarni et al.

(10) Patent No.: US 12,058,547 B2
(45) Date of Patent: Aug. 6, 2024

(54) SYSTEM AND METHOD FOR ARTIFICIAL INTELLIGENCE (AI) DRIVEN VOICE OVER LONG-TERM EVOLUTION (VoLTE) ANALYTICS

(71) Applicant: Samsung Electronics Co., Ltd., Suwon-si (KR)

(72) Inventors: Mandar N. Kulkarni, Richardson, TX (US); Yan Xin, Princeton, NJ (US); Han Wang, Plano, TX (US); Sangkyu Park, Seoul (KR); Jianzhong Zhang, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 273 days.

(21) Appl. No.: 17/547,002

(22) Filed: Dec. 9, 2021

(65) Prior Publication Data

US 2022/0210682 A1   Jun. 30, 2022

Related U.S. Application Data

(60) Provisional application No. 63/132,352, filed on Dec. 30, 2020.

(51) Int. Cl.
| | |
|---|---|
| H04W 24/10 | (2009.01) |
| H04L 41/5067 | (2022.01) |
| H04W 24/08 | (2009.01) |

(52) U.S. Cl.
CPC ......... *H04W 24/10* (2013.01); *H04L 41/5067* (2013.01); *H04W 24/08* (2013.01)

(58) Field of Classification Search
CPC .... H04W 24/10; H04W 24/08; H04L 41/5067

(Continued)

(56) References Cited

U.S. PATENT DOCUMENTS 7,689,455 B2    3/2010  Fligler et al.
10,332,056 B2*  6/2019  Yang ................. G06Q 10/06395
(Continued)

FOREIGN PATENT DOCUMENTS

| CN | 111385128 A | 7/2020 |
|---|---|---|
| WO | 2019037577 A1 | 2/2019 |

OTHER PUBLICATIONS

Allied Market Research, "Voice Over LTE (VoLTE) Market by Technology (VoIMS, CSFB, SVLTE, Voice Over LTE Via Generic Access Network and SRVCC)—Global Opportunity Analysis and Industry Forecast, 2015-2022", Jun. 2016, 3 pages. https://www.alliedmarketresearch.com/volte-market.

(Continued)

*Primary Examiner* — Mong-Thuy T Tran

(57) ABSTRACT

A network management apparatus of a wireless network includes a network interface, a processor, and a memory. The memory contains instructions, which when executed by the processor, cause the apparatus to receive, via the network interface, first data comprising values of key performance indicators (KPIs) obtained from elements of the wireless network for a first time period, receive, via the network interface, second data comprising values of key quality indicators (KQIs) for the first time period, wherein the KQIs comprise metrics of end-user quality of service (QoS) of the wireless network, and perform supervised learning to train an artificial intelligence (AI) model based on the first and second data, wherein features of the AI model are based on KPIs available from elements of the wireless network, and outputs of the AI model comprise values of one or more KQIs.

20 Claims, 9 Drawing Sheets

(58) Field of Classification Search
USPC .......................................................... 370/329
See application file for complete search history.

(56) References Cited

U.S. PATENT DOCUMENTS

| | | | |
|---|---|---|---|
| 10,397,810 B2 | 8/2019 | Yang et al. | |
| 10,489,363 B2* | 11/2019 | Yang | G06F 16/2465 |
| 10,785,101 B2 | 9/2020 | Li et al. | |
| 2016/0205697 A1* | 7/2016 | Tan | H04W 24/02 370/329 |
| 2017/0019291 A1* | 1/2017 | Tapia | H04L 41/16 |
| 2017/0262781 A1* | 9/2017 | Yang | G06Q 10/06393 |
| 2020/0084087 A1* | 3/2020 | Sharma | H04W 24/08 |
| 2020/0099572 A1 | 3/2020 | Peng et al. | |
| 2020/0382361 A1 | 12/2020 | Chandrasekhar et al. | |
| 2020/0404069 A1 | 12/2020 | Li et al. | |
| 2021/0176116 A1* | 6/2021 | Sharma | H04W 24/04 |
| 2021/0235287 A1* | 7/2021 | Ronen | H04W 24/02 |
| 2022/0006704 A1* | 1/2022 | Boyle | G06N 5/04 |
| 2022/0060963 A1* | 2/2022 | Szász | H04W 40/12 |
| 2022/0150752 A1* | 5/2022 | Balasubramanian | H04W 24/04 |
| 2022/0150760 A1* | 5/2022 | Balasubramanian | H04L 43/0876 |
| 2022/0151019 A1* | 5/2022 | Balasubramanian | H04W 76/34 |
| 2022/0188732 A1* | 6/2022 | Boyle | H04L 65/1104 |
| 2022/0201783 A1* | 6/2022 | Jones | H04L 5/0098 |
| 2023/0090169 A1* | 3/2023 | Mitcsenkov | H04L 65/1083 455/423 |

OTHER PUBLICATIONS

"Do ongoing calls suddenly 'go mute' at times? You may need to turn off VoLTE on your phone", The Economic Times, Apr. 26, 2018, 4 pages. https://economictimes.indiatimes.com/magazines/panache/do-ongoing-calls-suddenly-go-mute-at-times-you-may-need-to-turn-off-volte-on-your-phone/articleshow/63924756.cms.

"VoLTE Troubleshooting; Protect the Customer Experience with Iris Session Analyzer", Netscout Systems Inc., White Paper, 2016, 5 pages. https://www.netscout.com/sites/default/files/2017-03/SPWP_000-1600-VoLTE Troubleshooting.pdf.

"Samsung Redefines the Next Generation Network With Innovative User Experience-Centric Solutions at MWC Americas 2017", Sep. 2017, 3 pages. https://news.samsung.com/global/samsung-redefines-the-next-generation-network-with-innovative-user-experience-centric-solutions-at-mwc-americas-2017.

Yang et al., "Deep Network Analyzer (DNA): A Big Data Analytics Platform for Cellular Networks", IEEE Internet of Things Journal, vol. 4, No. 6, Dec. 2017, pp. 2019-2027.

International Search Report and Written Opinion issued Mar. 25, 2022 regarding International Application No. PCT/KR2021/019579, 7 pages.

Song et al., "KPI/KQI-Driven Coordinated Multi-Point in 5G: Measurements, Field Trials, and Technical Solutions", eprint arXiv:1904.07512, Apr. 2019, 15 pages.

* cited by examiner

SYSTEM AND METHOD FOR ARTIFICIAL INTELLIGENCE (AI) DRIVEN VOICE OVER LONG-TERM EVOLUTION (VoLTE) ANALYTICS

CROSS-REFERENCE TO RELATED APPLICATION AND CLAIM OF PRIORITY

This application claims priority under 35 U.S.C. § 119(e) to U.S. Provisional Patent Application No. 63/132,352 filed on Dec. 30, 2020. The above-identified provisional patent application is hereby incorporated by reference in its entirety.

TECHNICAL FIELD

This disclosure relates generally to wireless communication networks, including 5G networks and legacy networks. More specifically, this disclosure relates to systems and methods for artificial intelligence (AI) driven voice over Long-Term-Evolution (VoLTE) analytics.

BACKGROUND

The accelerating expansion, both in terms of numbers and types of mobile electronic devices which connect to wireless networks has reduced the operational margins of error for network operators. With so many devices connected to mobile communication networks and facets of human activity reliant upon communication through mobile voice and data networks, the importance of ensuring that mobile communications networks consistently operate at a high level, both in terms of throughput and communication quality has never been greater. To provide the high levels of performance demanded by an ever-expanding user base, network operators typically test new hardware and network configurations to obtain data for optimizing and improving the configuration and hardware of the network.

In many cases, quantitatively optimizing the configuration and hardware choices of a communications network can present a multi-pronged data sufficiency problem for network operators. For example, the performance effects of a change in network configuration and hardware are typically gauged from at least: a.) the perspective of apparatus under the control of the network operator (gauging, for example, whether the change improves the total throughput of the network); and b.) the perspective of apparatus not fully under the control of the operator, such as proprietary hardware used at a base station, or user equipment (UE) connected to the network. Typically, network operators can reliably and quickly obtain data from hardware fully under their control (such as the network's own servers and core network elements). However, for many hardware layers of a wireless network, performance data may be provided by outside sources or at low levels of granularity (for example, certain metrics may be recorded and reported every 15 minutes, while other metrics may be reported only on a daily basis). Thus, not all network performance data is not as reliably or instantly available to network operators. For network operators looking to quickly perform data-driven optimization of a network, the delayed availability or absence of performance data can present a technical problem, particularly in the context of implementing voice over long-term evolution (VoLTE) communication, where network operators are still extensively testing and seeking performance data for optimized implementation.

Similarly, the differences in the relative availability of network performance data can create delays or technical challenges with respect to debugging and solving network performance problems. Typically, the reported problem needs to be associated with user-side performance data, which in turn, needs to be associated with system-side data to understand which operating parameters may be anomalous and require adjustment. Because the performance data needed to analyze network performance problems may not be equally available and of consistent granularity, debugging and correcting such user-reported network problems can become more challenging and time consuming.

Accordingly, quickly performing data-based optimization and repair of wireless communication networks which are less reliant upon delayed or unavailable performance data remains a source of technical challenges and opportunities for improvement in the art.

SUMMARY

This disclosure provides methods and apparatus for methods and apparatus for improved estimation of the radiated power of a base station utilizing a per-antenna power constraint (PAPC).

In one embodiment, a network management apparatus of a wireless network includes a network interface, a processor, and a memory. The memory contains instructions, which when executed by the processor, cause the apparatus to receive, via the network interface, first data comprising values of key performance indicators (KPIs) obtained from elements of the wireless network for a first time period, receive, via the network interface, second data comprising values of key quality indicators (KQIs) for the first time period, wherein the KQIs comprise metrics of end-user quality of service (QoS) of the wireless network, and perform supervised learning to train an artificial intelligence (AI) model based on the first and second data, wherein features of the AI model are based on KPIs available from elements of the wireless network, and outputs of the AI model comprise values of one or more KQIs.

In another embodiment, a method of operating a network management apparatus of a wireless network includes receiving, via a network interface, first data comprising values of key performance indicators (KPIs) obtained from elements of the wireless network for a first time period. The method further includes receiving, via the network interface, second data comprising values of key quality indicators (KQIs) for the first time period, wherein the KQIs comprise metrics of end-user quality of service (QoS) of the wireless network, and performing supervised learning to train an artificial intelligence (AI) model based on the first and second data, wherein features of the AI model are based on KPIs available from elements of the wireless network, and outputs of the AI model comprise values of one or more KQIs.

In another embodiment, a non-transitory computer-readable medium contains instructions, which, when executed by a processor, cause an apparatus to receive, via a network interface of the apparatus, first data comprising values of key performance indicators (KPIs) obtained from elements of a wireless network for a first time period, receive, via the network interface, second data comprising values of key quality indicators (KQIs) for the first time period, wherein the KQIs comprise metrics of end-user quality of service (QoS) of the wireless network, and perform supervised learning to train an artificial intelligence (AI) model based on the first and second data, wherein features of the AI model are based on KPIs available from elements of the wireless network, and outputs of the AI model comprise values of one or more KQIs.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

To meet the demand for wireless data traffic having increased since deployment of 4G communication systems and to enable various vertical applications, efforts have been made to develop and deploy an improved 5G/NR or pre-5G/NR communication system. Therefore, the 5G/NR or pre-5G/NR communication system is also called a "beyond 4G network" or a "post LTE system." The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 1:
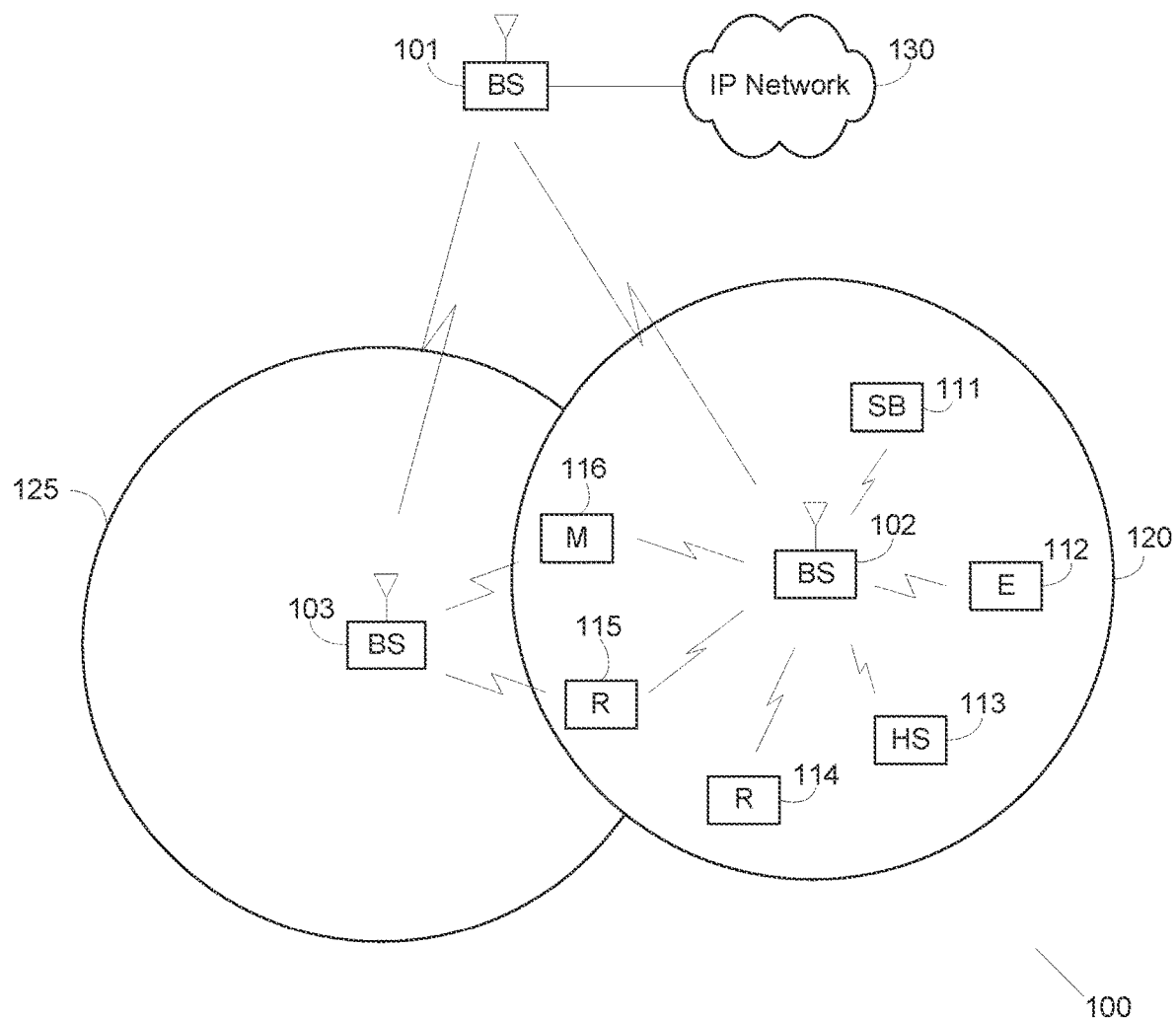
FIG. 1 provides an illustrative example of a wireless network in which methods according to certain embodiments of this disclosure may be performed.

FIG. 1 illustrates an example wireless network 100 according to this disclosure. The embodiment of the wireless network 100 shown in FIG. 1 is for illustration only. Other embodiments of the wireless network 100 can be used without departing from the scope of this disclosure.

The wireless network 100 includes a base station 101, a base station 102, and a base station 103. The base station 101 communicates with the base station 102 and the base station 103. The base station 101 also communicates with at least one Internet Protocol (IP) network 130, such as the Internet, a proprietary IP network, or other data network.

Depending on the network type, the term base station can refer to any component (or collection of components) configured to provide remote terminals with wireless access to a network, such as base transceiver station, a radio base station, transmit point (TP), transmit-receive point (TRP), a ground gateway, an airborne gNB, a satellite system, mobile base station, a macrocell, a femtocell, a WiFi access point (AP) and the like. Embodiments according to the present disclosure are not premised on network equipment belonging to a particular generation or standard set (for example, LTE, 5G, 3G, etc.) Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses a base station, whether the UE is a mobile device (such as a mobile telephone or smartphone) or is normally considered a stationary device (such as a desktop computer or vending machine).

The base station 102 provides wireless broadband access to the network 130 for a first plurality of user equipments (UEs) within a coverage area 120 of the base station 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The base station 103 provides wireless broadband access to the network 130 for a second plurality of UEs within a coverage area 125 of the base station 103. The second plurality of UEs includes the UE 115 and the UE 116. In some embodiments, one or more of the base stations 101-103 may communicate with each other and with the UEs 111-116 using 5G, long-term evolution (LTE), LTE-A, WiMAX, or other advanced wireless communication techniques.

Dotted lines show the approximate extents of the coverage areas 120 and 125, which are shown as approximately circular for the purposes of illustration and explanation only. It should be clearly understood that the coverage areas associated with base stations, such as the coverage areas 120 and 125, may have other shapes, including irregular shapes, depending upon the configuration of the base stations and variations in the radio environment associated with natural and man-made obstructions.

As described in more detail below, one or more of BS 101, BS 102 and BS 103 include 2D antenna arrays as described in embodiments of the present disclosure. In some embodiments, one or more of BS 101, BS 102 and BS 103 support the codebook design and structure for systems having 2D antenna arrays.

Although FIG. 1 illustrates one example of a wireless network 100, various changes may be made to FIG. 1. For example, the wireless network 100 can include any number of base stations and any number of UEs in any suitable arrangement. Also, the base station 101 can communicate directly with any number of UEs and provide those UEs with wireless broadband access to the network 130. Similarly, each base station 102-103 can communicate directly with the network 130 and provide UEs with direct wireless broadband access to the network 130. Further, the base station 101, 102, and/or 103 can provide access to other or additional external networks, such as external telephone networks or other types of data networks.

Figure 2:
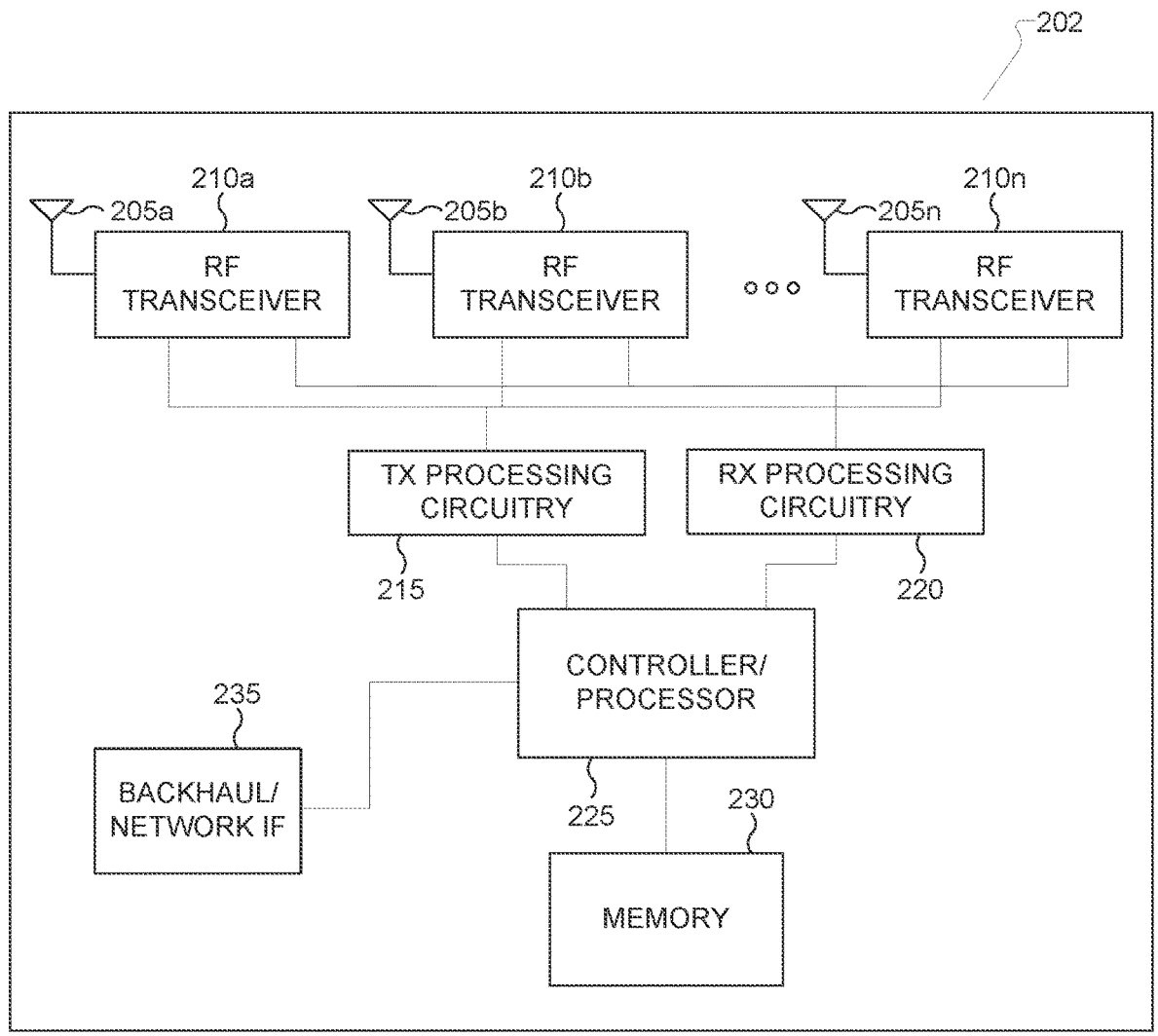
FIG. 2 illustrates an example of a base station in accordance with an embodiment of this disclosure.

FIG. 2 illustrates an example base station 202 according to this disclosure. The embodiment of the base station 202 illustrated in FIG. 2 is for illustration only. However, base stations come in a wide variety of configurations, and FIG. 2 does not limit the scope of this disclosure to any particular implementation of base station.

As shown in the explanatory example of FIG. 2, the base station 202 includes multiple antennas 205a-205n, multiple RF transceivers 210a-210n, transmit (TX) processing circuitry 215, and receive (RX) processing circuitry 220. The base station 202 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. According to certain embodiments, TX processing circuitry 215 may modular and may comprise one or more data units (DUs) or massive multi-input/multi-output units (MMUs) for pre-coding and pre-processing multiplexed signals to be transmitted via a plurality of antennas. The RF transceivers 210a-210n receive the outgoing processed baseband or IF signals from the TX processing circuitry 215 and up-converts the baseband or IF signals to RF signals that are transmitted via the antennas 205a-205n. According to certain embodiments, the RF signals transmitted via antennas 205a-205n are encoded such that data to be transmitted, and the associated signaling are apportioned to time/frequency resource blocks ("RBs"). In this illustrative example, base station 202 provides, through antennas 205a-205n wireless signals over a coverage area, and has a number of operational parameters, such as antenna height, electronic and mechanical tilt, by which the coverage area can be tuned. In this way, the base station can, for example, transmit signals satisfying threshold values for received signal strength and received signal quality within a designated coverage area of the base station.

The controller/processor 225 can include one or more processors or other processing devices that control the overall operation of the base station 202. For example, the controller/processor 225 could control the reception of uplink and downlink signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the base station 202 by the controller/processor 225. In some embodiments, the controller/processor 225 includes at least one microprocessor or microcontroller.

The controller/processor 225 is also capable of executing programs and other processes resident in the memory 230, such as a basic OS. The controller/processor 225 can move data into or out of the memory 230 as required by an executing process.

The controller/processor 225 is also coupled to the backhaul or network interface 235. The backhaul or network interface 235 allows the base station 202 to communicate with other devices or systems over a backhaul connection or over a network. The interface 235 could support communications over any suitable wired or wireless connection(s). For example, when the base station 202 is implemented as part of a cellular communication system (such as one supporting 5G, LTE, or LTE-A), the interface 235 could allow the base station 202 to communicate with other eNBs over a wired or wireless backhaul connection. When the base station 202 is implemented as an access point, the interface 235 could allow the base station 202 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of base station 202, various changes may be made to FIG. 2. For example, the base station 202 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the base station 202 could include multiple instances of each (such as one per RF transceiver). Also, various components in FIG. 2 could be combined, further subdivided, or omitted and additional components could be added according to particular needs.

Figure 3:
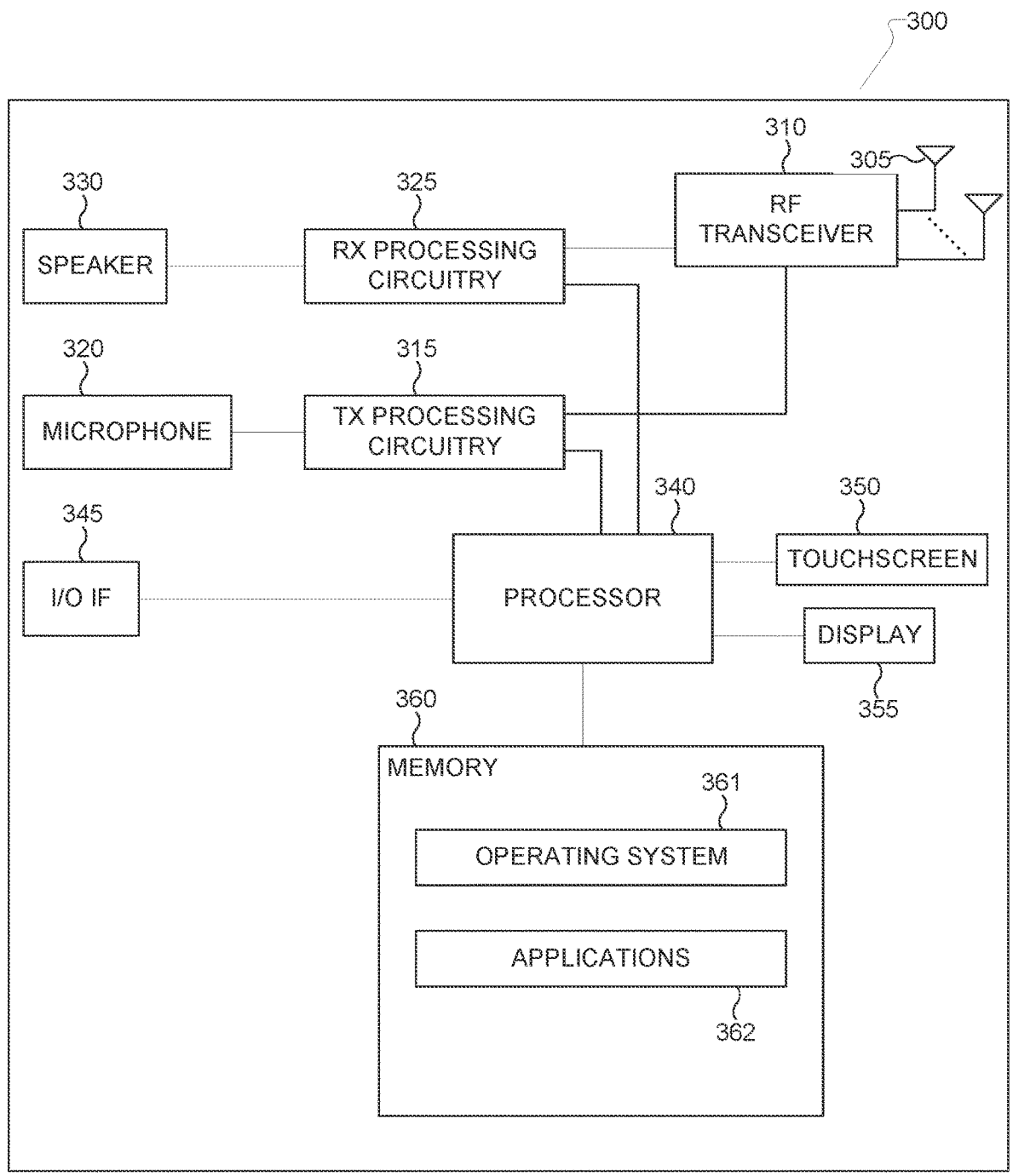
FIG. 3 illustrates an example of a user equipment ("UE") in accordance with an embodiment of this disclosure.

FIG. 3 illustrates an example UE 300 according to this disclosure. The embodiment of the UE 300 illustrated in FIG. 3 is for illustration only, and the UEs 105a-105c of FIG. 1 could have the same or similar configuration. However, UEs come in a wide variety of configurations, and FIG. 3 does not limit the scope of this disclosure to any particular implementation of a UE.

As shown in FIG. 3, the UE 300 includes an antenna 305, a radio frequency (RF) transceiver 310, transmit (TX) processing circuitry 315, a microphone 320, and receive (RX) processing circuitry 325. The UE 300 also includes a speaker 330, a main processor 340, an input/output (I/O) interface (IF) 345, a keypad 350, a display 355, and a memory 360. The memory 360 includes a basic operating system (OS) program 361 and one or more applications 362.

The RF transceiver 310 receives from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the main processor 340 for further processing (such as for web browsing data).

The TX processing circuitry 315 receives analog or digital voice data from the microphone 320 or other outgoing baseband data (such as web data, e-mail, or interactive video game data) from the main processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305. According to certain embodiments, TX processing circuitry and RX processing circuitry encode and decode data and signaling for wireless in resource blocks ("RBs" or physical resource blocks "PRBs") which are transmitted and received by, inter alia, the eNBs of a wireless network (for example, wireless network 100 in FIG. 1). Put differently, TX processing circuitry 215 and RX processing circuitry 220 generate and receive RBs which contribute to a measured load at an eNB. Additionally, RX processing circuitry 220 may be configured to measure values of one or more parameters of signals received at UE 300.

The main processor 340 can include one or more processors or other processing devices and execute the basic OS program 361 stored in the memory 360 in order to control the overall operation of the UE 300. For example, the main processor 340 could control the reception of uplink signals and the transmission of downlink signals by the RF transceiver 310, the RX processing circuitry 325, and the TX processing circuitry 315 in accordance with well-known principles. In some embodiments, the main processor 340 includes at least one microprocessor or microcontroller.

The main processor 340 is also capable of executing other processes and programs resident in the memory 360. The main processor 340 can move data into or out of the memory 360 as required by an executing process. In some embodiments, the main processor 340 is configured to execute the applications 362 based on the OS program 361 or in response to signals received from eNBs or an operator. The main processor 340 is also coupled to the I/O interface 345, which provides the UE 300 with the ability to connect to other devices such as laptop computers and handheld computers. The I/O interface 345 is the communication path between these accessories and the main processor 340.

The main processor 340 is also coupled to the keypad 350 and the display unit 355. The operator of the UE 300 can use the keypad 350 to enter data into the UE 300. The display 355 may be a liquid crystal display or other display capable of rendering text and/or at least limited graphics, such as from web sites.

The memory 360 is coupled to the main processor 340. Part of the memory 360 could include a random-access memory (RAM), and another part of the memory 360 could include a Flash memory or other read-only memory (ROM).

Although FIG. 3 illustrates one example of UE 300, various changes may be made to FIG. 3. For example, various components in FIG. 3 could be combined, further subdivided, or omitted and additional components could be added according to particular needs. As a particular example, the main processor 340 could be divided into multiple processors, such as one or more central processing units (CPUs) and one or more graphics processing units (GPUs). Also, while FIG. 3 illustrates the UE 300 configured as a mobile telephone or smartphone, UEs could be configured to operate as other types of mobile or stationary devices.

Figure 4:
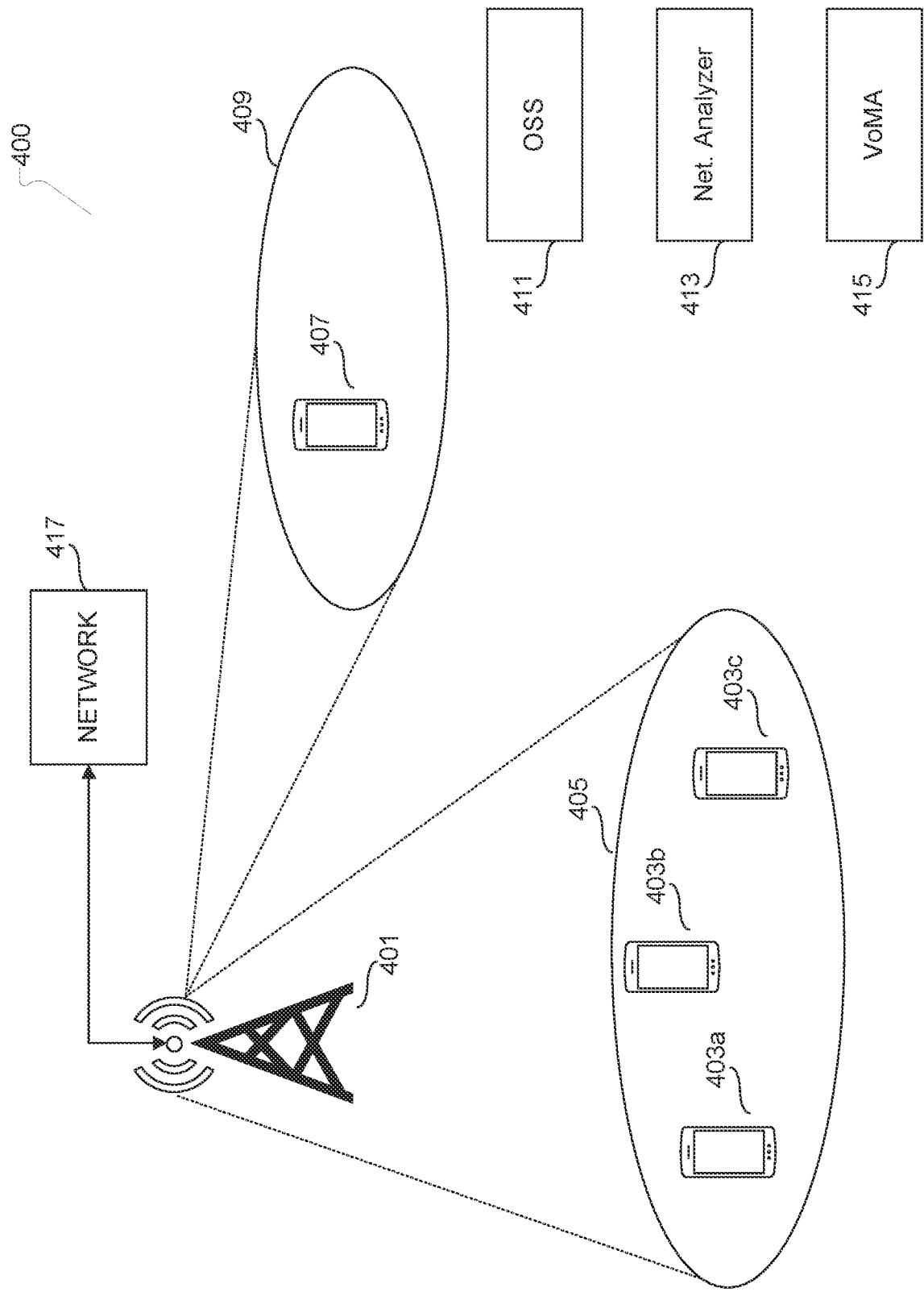
FIG. 4 illustrates an example of a network context according to various embodiments of this disclosure.

FIG. 4 illustrates an example of a network context 400 according to various embodiments of this disclosure.

Referring to the non-limiting example of FIG. 4, network context 400 comprises at least one base station or evolved node B ("eNB") 401 (for example, an instance of base station 202 in FIG. 2) which transmits and receives signals with user equipment 403a-403c of a first cell 405 as well as user equipment 407 of a second cell 409. In this example, eNB 401 comprises one or more processors executing performance reporting software. In many embodiments, the performance reporting software is provided by third party vendors and may be specific to a vendor (i.e., where eNB hardware is sourced from different vendors, different vendors' hardware may have different software and different reporting functionalities). Additionally, in some embodiments, the performance reporting software may be operator-specific, providing a common set of performance metrics for all of the eNBs in an operator's network.

In certain embodiments according to this disclosure, the performance and health of a network are monitored through key performance indicators (KPIs) and key quality indicators (KQIs). As used in this disclosure, the expression "KPIs" encompasses operational metrics of the network (for example, metrics of throughput or signal-to-noise-ratio), which are available to the network operator at one or more of an eNB or cell level. Additional examples of KPIs include, without limitation, a number of active users connected per cell, a number of hybrid ARQ (automatic repeat request) attempts, and metrics of user transmit power headroom. Further, as used in this disclosure, the expression "KQIs" encompasses a subset of KQIs which are considered to be representative of the overall health of the network. In the context of VoLTE networks, call drops and muting events (i.e., where a participant becomes inaudible) are examples of KQIs.

Referring to the illustrative example of FIG. 4, KPIs and KQIs are collected, logged and made available to the network operator through three separate software reporting systems. According to some embodiments, one such software reporting system is an Operations Support System (OSS) 411. In some embodiments, OSS 411 is a software system that logs and reports a mixture of KPIs, Configuration Management (CM) Parameters and Alarms (sometimes also referred to as Fault Management (FM) data), obtained from eNB 401 and other eNBs within a network. In some embodiments, PM data is periodically reported to a network operator's system, for example, once every 15 minutes, from each cell supported by eNB 401. According to some embodiments, PM data is provided as counter values, floating point values and histograms. OSS 411 may also collect and report configuration parameters from eNB 401, at a lower level of granularity than PM data, for example, once a day. OSS 411 also logs and reports FM data notifying network operators of the occurrence of alarm events, which are not scheduled, but rather, triggered in response to detected hardware or software failures at eNB 401.

Typically, OSS 411 provides vendor-specific KPI and KQI data, and for a given network with hardware from multiple vendors, there may be two or more vendor-specific instances of OSS 411. Additionally, in network context 400, data may be provided by a network analyzer 413, comprising software obtaining data across multiple eNBs and network nodes and logging and reporting KPIs and KQIs. Examples of software which can operate as network analyzer 413 include, without limitation, Irisview Netscout. According to certain embodiments, network analyzer 413 reports additional KQIs, such as values of RTP Gap Ratio and SIP DC Ratio, which serve as benchmarks of VoLTE performance in terms of muting and call drop failures.

As shown in the illustrative example of FIG. 4, network performance metrics may also be reported through a voice measurement and analysis (VOMA) analyzer 415, for example an instance of the SAMSUNG VOMA solution. According to various embodiments, VOMA analyzer 415 can generate KPI logs on a per call basis. In certain embodiments, a VOMA server implementing VOMA analyzer 415 randomly collects data for a specified number of calls routed through eNB 401. VOMA analyzer 415 can also provide aggregated KPIs at a cell level for KPIs specifically pertaining to VoLTE communications, such as KPIs associated with patches of silence and bursts of audio in a VoLTE session. The KPIs reported by VOMA 415 may be well suited for troubleshooting or RCA purposes since they have ability to distinguish the source of degradation (muting or packet loss or jitter) between uplink, downlink and backhaul. Depending on embodiments, VOMA analyzer 415 may log and report KPIs at a preset level of granularity (for example, once every 15 minutes).

Thus, as shown with reference to the illustrative example of FIG. 4, operators of mobile communication networks receive the data to monitor and optimize the performance of the networks from a variety of sources which provide the data at different levels of granularity, and are, to varying degrees, specific to a specific network vendor. Thus, where a network operator changes reporting services or hardware associated with a vendor providing vendor-specific data, operators face interruptions and gaps in the data for optimizing network parameters and troubleshooting network problems. As discussed herein, certain embodiments according to this disclosure leverage specifically trained artificial intelligence models to solve the data sufficiency problems associated with network operators' reliance on disparate and discontinuous sources of network performance data.

As shown in the explanatory example of FIG. 4, base station 401 is communicatively connected, for example, through a backhaul link to an operator's communication network 417. According to various embodiments, communication network 417 is a network supporting one or more generations of wireless communication protocols (for example, 3G, LTE or 5G) and comprising a core network with one or more processing platforms (for example, cloud or fixed servers) operating as network management apparatus (for example, a RAN intelligent controller ("RAN")) handling control plane operations and managing data traffic across network 417 and the base stations 401 operating as access points to network 417.

Figure 5:
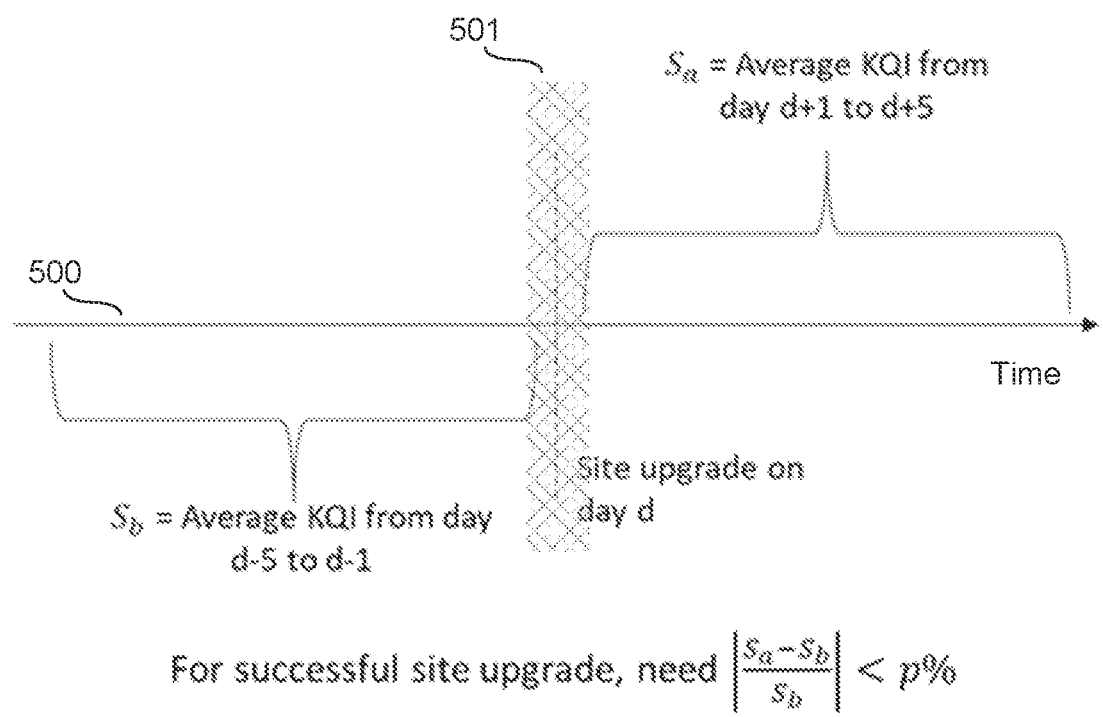
FIG. 5 illustrates an example of a data sufficiency problem arising in a network context in which network performance data for optimization and diagnostics is provided by disparate and potentially discontinuous sources.

FIG. 5 illustrates an example of a data sufficiency problem arising in a network context in which network performance data for optimization and diagnostics is provided by disparate and potentially discontinuous sources.

Referring to the non-limiting example of FIG. 5, a timeline 500 is shown in the figure. On day D, a network component (for example, an eNB) from a first vendor is replaced with a component from a second vendor. In this example, the network operator needs to assess whether the component replacement provides a quantifiable improvement in network performance. Further, given the increased reliance on wireless networks as a backbone for all types of communications (wireless networks now not only voice data between gamers, but also calls to emergency services, such as 911), it is important that the network operator have actionable data quickly, so that the network can be restored to its previous configuration, in the event that the component replacement significantly degrades performance. In this example, the performance effects of the component replacement are measured based on a vendor-specific KPI, S, provided by the vendors of the original and replaced network component. Thus, for a first period, from day d+1 onwards, the values of S are provided by a software reporting package from the vendor of the new component, and for a second interval up to day d−1, the values of S are provided by a software reporting package (for example, OSS 411 in FIG. 4) of the original component.

To determine whether the replacement of the network component improves the overall performance of the network, a network operator may determine whether the "lift" or performance gain attributable to the change in network component according to Equation 1, below:

$$\left| \frac{S_a - S_b}{S_b} \right| < p \text{ \%} \quad \text{Equation 1}$$

Where $S_a$ is an average value of KQI S during a specified period after the change at day D, $S_b$ is an average value of KQI S during a specified period before the change at day D, and p is a threshold percentage value. Due to the fact that components are typically not instantly replaceable, and the KQI data for S is vendor-specific and goes from being provided from a first vendor to a second vendor, the switch of components and source of vendor-specific KQI data for S results in a blackout period 501, during which the value of S is not being reported to the network operator. For network operators, blackout period 501 is undesirable, as it delays the operator's ability to make a data-driven determination as to whether the change of component change provided a justifiable lift in network performance.

In the illustrative example of FIG. 5, KQI S may be associated with, and move in relation to the values of other network KPIs for which values are available during blackout period 501. However, in real-world network implementations, there may be tens, if not hundreds, of KPIs for which values are available to the operator, meaning that identifying KPIs whose movement is predictive of a value of a given KQI, and defining the predictive relationship between the identified KPIs and the KQI of interest has historically been considered impossible, due to the complexity of the problem. As discussed herein, in certain embodiments according to this disclosure, artificial intelligence (AI) models can be trained to identify features which are predictive of metrics of interest, and to predict unavailable KQI and KPI values. In this way, certain embodiments according to this disclosure can "backfill" the KQI values during blackout period 501 based on available data, thereby more quickly providing operators with the data to determine whether the equipment change at day D improved overall network performance.

Figure 6:
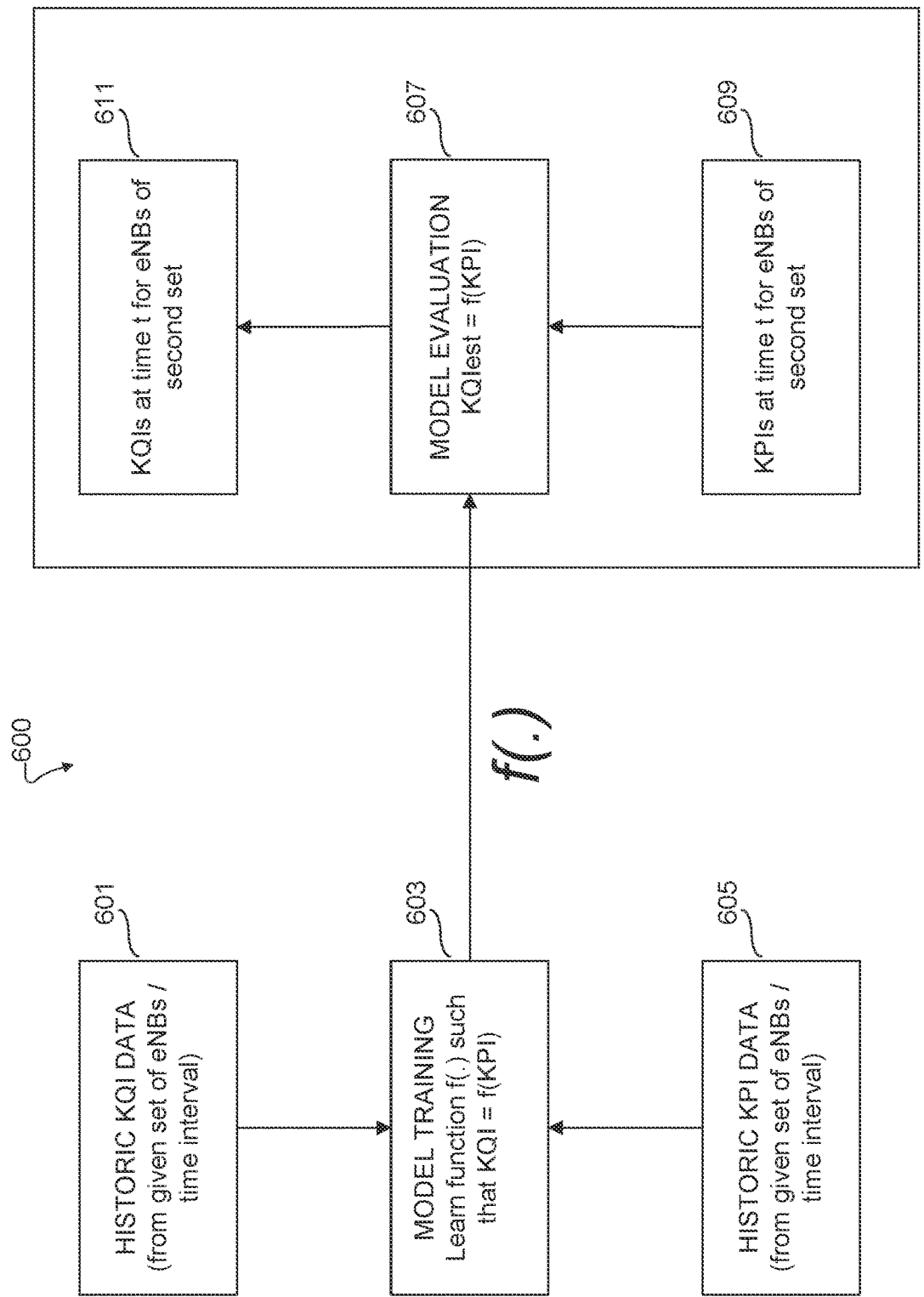
FIG. 6 illustrates, in block diagram format, an example of a pipeline for training and implementing an AI model which can utilize available KPI data to backfill unavailable KPI or KQI data, according to various embodiments of this disclosure.

FIG. 6 illustrates, in block diagram format, an example of a pipeline 600 for training and implementing an AI model which can utilize available KPI data to backfill unavailable KPI or KQI data, according to various embodiments of this disclosure. Referring to the illustrative example of FIG. 6, an estimation model f(.) is generated from training one or more machine learning models, such as a random forest model, or neural network based on historic KPI and KQI data, in order to recognize predictive patterns between a set of KPIs and one or more KQIs of interest.

Referring to the non-limiting example of FIG. 6, at block 601, a computing platform (for example, user equipment 300 in FIG. 3, or a server or other platform comprising a CPU capable of training an AI model (for example, by calculating a gradient descent) and a non-transitory memory) receives historic KQI data. As used in this disclosure, the expression historic KQI data encompasses values of one or more KQIs of interest, collected across a first set of network elements (for example, eNBs) over a first time interval. In the context of VoLTE communications, examples of KQIs of interest include, without limitation, Session Initiation Protocol (SIP) Dropped Call Ratio ("SIP DC Ratio"), which reflects the ratio of dropped to total VoLTE calls as reported through session initiation protocol data at a core network. Examples of KQIs of interest also include, without limitation, Real-time Transport Protocol Gap Ratio ("RTP Gap Ratio"), which quantifies a ratio of VoLTE muting duration RTP sessions to a total RTP session. As used herein, the expression "VoLTE muting" encompasses events where a timestamp difference between successive RTP packets received at a core network exceeds a threshold value (for example, 500 ms), and is perceived by users as a "muting" of voice audio.

According to various embodiments, at block 603, the computing platform training and implementing estimation model f(.) receives historic KPI data. In order to train estimation model f(.), the historic KPI data comprises KPI data obtained across one or more sources (for example, OSS 411, network analyzer 413 and VOMA server 415 in FIG. 4) connected to the eNBs of the first set over the same time period as the historic KPI data. As noted elsewhere in this disclosure, depending on the source, KPIs may be reported at different levels of granularity, with one vendor reporting a given KPI at, for example, fifteen-minute intervals, and another vendor reporting the same KPI at, for example, twenty minute intervals. At block 603, the platform implementing estimation model f(.) may pre-process the KPI data, to conform analogous KPI datums to the measurement times and granularity of the historical KQI data. Additionally, the historical KQI data may be provided at different levels of aggregation than KPI data. For example, certain KPIs may be reported on a per-UE or per-cell basis, while the historical KQI data is reported at a per-eNB level. At block 603, the historical KPI data may be aggregated so that the historical KQI and historical KPI are analytically analogous.

In certain embodiments, KPI data can be aggregated using a clustering algorithm to generate sets of KPI data of equivalent geographic level as the historical KQI data (for example, at the cell or eNB level). For example, locality or cluster level KPI aggregation may be performed as follows. For each eNB in a network with a given timestamp, the other eNBs within a specified distance (for example, a Euclidean radius) are identified. Specifically, for a KPI specified as KPI=$g(c_1, \ldots, c_n)$, where $c_1, \ldots, c_n$ are counters from a data source and $g(.)$ is a mapping function (can be different for each KPI). Then aggregated KPI data can be generated according to KPI=$g(o[c_1], \ldots, o[c_n])$ or KPI=$o[g(c_1, \ldots, c_n)]$ where $o[.]$ is an operator for summation, averaging, maximization or minimization and acts on all samples across different eNBs in a spatial cluster.

Given that estimation model $f(.)$ is trained to provide data to backfill performance data for assessing whether a KQI satisfies a threshold condition, in certain embodiments, once standardized to the time and aggregation intervals of the historical KQI data, at block 603, the historical KPI data is further pre-processed to create synthetic KPIs. As used in this disclosure, the expression synthetic KPI encompasses a KPI, which through combination with one or more other KPIs, or mathematical manipulation, is based on a reported KPI, but differs from a KPI value reported by the data collection sources of the network. Table 1 below provides non-limiting examples of synthetic KPIs which may be generated at block 603.

According to various embodiments, combining, or pre-processing the KPIs to create synthetic KPIs can provide the technical benefit of reducing the number of features provided to $f(.)$, thereby improving the efficiency with which $f(.)$ may be trained and used to generate estimated values of KQIs of interest.

Referring to the non-limiting example of FIG. 6, at block 605, supervised learning is performed to train one or more artificial intelligence (AI) based estimation models $f(.)$ to generate estimated values of a KQI of interest from a feature set of KPIs and/or synthetic KPIs. As one non-limiting example, where the KQI of interest is either an SIP DC ratio or an RTP gap ratio, the feature set for $f(.)$ may comprise the KPI features shown in Table 2, below:

TABLE 2

| KPIs |
| --- |
| PdcpSduLossRateUL |
| TotQCI1PrbULUsed |
| TotTtibQCI1PrbULUsed |
| ULVoLTESinrDistPreCombBin1 ... 19 |
| VoLTEDropRate |

TABLE 1

| Synthetic KPI | Formula |
| --- | --- |
| ConnReEstabRate (rate at which RRC connection is restablished after RRC connection drop) | $100 \times \dfrac{ConnReEstabAtt}{ConnReEstabSucc}$ |
| CallDropQci_EccbTot (rate at which calls are dropped per QCI, specifically QCI-1 and QCI-5) | CallDropQci_EccbDspAuditRlcMacCallRelease + CallDropQci_EccbRcvResetRequestFromEcmb + CallDropQci_EccbRcvCellReleaseIndFromEcmb + CallDropQci_EccbRadioLinkFailure + CallDropQci_EccbDspAuditMacCallRelease + CallDropQci_EccbArqMaxReTransmission + CallDropQci_EccbDspAuditRlcCallRelease + CallDropQci_EccbTmoutRrcConnectionReconfig + CallDropQci_EccbTmoutRrcConnectionReestablish + CallDropQci_EccbS1SctpOutOfService |
| ConnDropRate (rate at which radio link failure happens in the network) | $\dfrac{RlfDetection\_RadioLinkFailure + RlfDetection\_ArqMaxReTransmission}{ConnReEstabSucc}$ |
| TtibActFailRate (rate at which TTI bundling algorithm activation fails) | $100 \times (1 - TtibActSucc/TtibActAtt)$ |
| TtibDeactFailRate (rate at which TTI bundling algorithm deactivation fails) | $100 \times (1 - TtibDeactSucc/TtibDeactAtt)$ |
| TimeAdvanceRatio (fraction of users with large TimeAdvanceSection index, large index representative of large distance of users from eNB) | $\dfrac{\Sigma_{i \geq 20} TimeAdvanceSection_i}{\Sigma_{i < 20} TimeAdvanceSection_i}$ |
| CellEdgeSINRPreComp5 (worst 5th percentile SINR per cell or per eNB) | 5th percentile of SINR distribution according to ULVoLTESinrDistPreCompBin$_i$ for i = 1, ..., 19 |
| CellEdgeSINRPreComp20 (worst 20th percentile SINR per cell or per eNB) | 20th percentile of SINR distribution according to ULVoLTESinrDistPreCompBin$_i$ for i = 1, ..., 19 |

TABLE 2-continued

KPIs

VoLTEULQualityDefectRate
VoLTEDLQualityDefectRate
VoLTEIntraHoSuccessRate
VoLTEX2HoSuccessRate
ERABSetupFailureRateQCI1
EstabInitSuccNbr
EstabInitAttNbr
EstabAddAttNbr
EstabAddSuccNbr
RoHCDecompFailRate
SumVoLTEInterS1OutSucc
SumVoLTEInterS1OutAtt According to certain embodiments, once the historic KPI data has been pre-processed to match the granularity and time scales of the historic KQI data and values within the KPI data corresponding to input KPI features have been identified, the historic KPI data is fed as an input to a machine learning algorithm (for example, a random forest regression model) to obtain an estimation function f(.) which maps KPI feature values to KQI values. In certain embodiments, other machine learning regression or classification models (or combinations thereof) may be used to generate estimation function f(.). Examples of suitable machine learning models include, without limitation deep neural networks, linear regression, support vector kernels, and the XGBoost and AdaBoost models.

Referring to the illustrative example of FIG. 6, at block 607, the trained estimation model f(.) can be used to map values of KPI features for a specified time interval to KQI values 611 corresponding to the same time interval. In this way, estimation function f(.) can be used to backfill missing KQI (or, if desired, missing KPI data) based on available KPI data.

Site acceptance, where an operator needs to ensure that a component from a new vendor (V2) provides a quantitative performance improvement over an existing component from an existing vendor (V1) provides a non-limiting use case for how to backfill missing network optimization data based on estimated data from a suitably trained AI model (for example, estimation function f(.)). In many real-world implementations, changes to network components which degrade performance present significant operational problems, as end user experience may be degraded (potentially resulting in essential communications, such as emergency calls, not going through properly), and network operators losing competitive ground. Accordingly, network operators need to quickly and accurately make data-based site acceptance decisions.

As one example, for many operators, for a component replacement to be acceptable, the values of a representative KQI (for example, in the case of a VoLTE network, SIPDCRatio or RTPGapRatio) need to fall within a threshold range of the historical values within a specified time window (for example, within five (5) days of the component replacement). Other combinations of threshold values, KQIs and testing window are possible and within the contemplated scope of this disclosure. In many real-world implementations, replacing a network component, particularly one with vendor-specific KQI reporting, produces a blackout period in vendor-specific KQI data, following the switch from a component from vendor V1 to vendor V2. According to certain embodiments, the determination of whether to accept the component from vendor V2 can still be made within the five-day decision window by backfilling in vendor-specific KQI data during the blackout period with estimated data based on available KPI data provided to estimation function f(.).

For example, suppose the ideal site acceptance condition C1 for the replacement component may be specified by Equation 2, below:

$$\left| \frac{SIPDC_{vendor\ V1,eNB} - SIPDC_{vendor\ V2,eNB}}{SIPDC_{vendor\ V1,eNB}} \right| < 5\% \quad \text{Equation 2}$$

where $SIPDC_{vendor\ V1,\ eNB}$ is the average of SIPDC ratio KQI before site is upgraded from V1 to V2 vendor over a window of K days. Where KQI data is unavailable due to a replacement-related blackout, a revised condition C2 that can be checked with backfilled KQI data may be specified by Equation 3, below:

$$\left| \frac{SIPDC_{vendor\ V1,eNB} - SIPDC_{vendor\ V2,eNB}^{predicted}}{SIPDC_{vendor\ V1,eNB}} \right| < p\% \quad \text{Equation 3}$$

Revised condition will entail understanding the value of p so that acceptance condition C2 results in acceptance of changes that would be acceptable under the original acceptance condition, C1. Provided the condition specified by Equation 4, below is met:

$$\left| \frac{SIPDC_{vendor\ V2,eNB}^{predicted} - SIPDC_{vendor\ V2,eNB}}{SIPDC_{vendor\ V1,eNB}} \right| < c\% \quad \text{Equation 4}$$

It follows that C1 holds whenever C2 holds and p+c<5. If we know $SIPDC_{Vendor\ V1,\ eNB}$ for a site, we can provide guarantees on the values of Equation 4. Using backfilled KQI data provides values of $SIPDC_{Vendor\ V2,eNB}^{predicted}$ and $SIPDC_{Vendor\ V2,eNB}$ which permit computing a value of p from which a reliable determination of whether the criteria for site estimation have been satisfied.

While embodiments according to this disclosure have thus far been described with respect to optimizing wireless networks, in particular, VoLTE networks more quickly by backfilling missing KQI data with AI-estimated KQI data, the present application is not limited thereto. For example, the systems and methods for estimating missing KQI data can be adapted to generate estimates of missing KPI data. Additionally, certain embodiments according to the present application also include systems and methods for troubleshooting KQI abnormalities using artificial intelligence-based mapping of KQI and KPI data.

Figure 7:
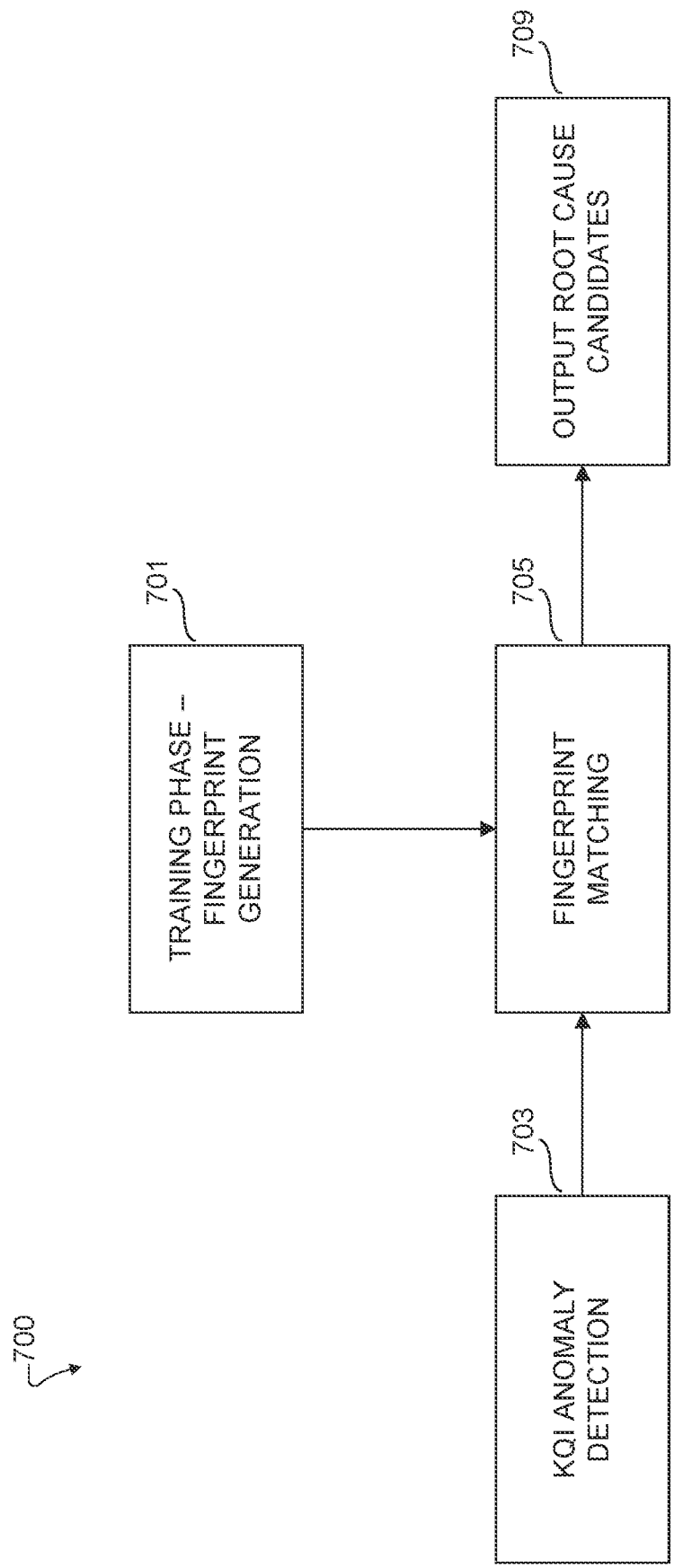
FIG. 7 illustrates, in block diagram format, an example of a pipeline for training an artificial intelligence (AI) based root cause analysis model, and for utilizing such a trained model to identify candidate root causes of performance abnormalities within a wireless communication network, according to various embodiments of this disclosure.

FIG. 7 illustrates, in block diagram format, an example of a pipeline 700 for training an artificial intelligence (AI) based root cause analysis model, and for utilizing such a trained model to identify candidate root causes of performance abnormalities within a wireless communication network, according to various embodiments of this disclosure.

As noted elsewhere in this disclosure, mobile communications networks (for example, network 100 shown in FIG. 1) present significant analytical challenges, in that a given network may comprise tens or hundreds of base stations and other components, about which values of KPI/KQI values may be reported. As such, attempts at machine-based mapping of abnormal KQI/KPI values to root cause problems have proven generally unsuccessful, and network operators have hitherto relied almost exclusively on the experience-based intuition of technicians to identify candidate root causes for network abnormalities. However, such reliance on human technicians may be problematic, in at least the following ways. First, as networks continue to evolve in their complexity and new protocols (for example, VoLTE) are phased in, technicians' experience with older protocols becomes less relevant, and intuition-based analyses become less effective. Second, as networks grow in size and complexity, to support an increasing volume of users and devices, the demand for analysis and debugging of networks may outstrip the availability of technicians with sufficient experience to effectively identify root cause issues. Accordingly, certain embodiments according to this disclosure provide highly scalable and future-proof alternatives to reliance on human technicians for performing root cause analyses ("RCAs") of abnormalities in wireless networks.

Referring to the illustrative example of FIG. 7, at block 701, an association rule mining algorithm is applied to historical KQI and KPI training data to generate a set of rules associating anomalous KQIs with a set of KPIs based on the training data. As used in this disclosure, the expression "fingerprint" encompasses the modeled association between the anomalous KQI (or, in some embodiments, an anomalous KPI) and a selected set of KPIs.

According to various embodiments, at block 701, a processing platform implementing pipeline 700 (for example, the UE 300 shown in FIG. 3, obtains historical KQI and KPI training data for a shared time interval and pertaining to a common set of base stations or network nodes. The training data is then pre-processed (for example, as described with reference to block 603 of FIG. 6, such that the KPI and KQI data are equivalently aggregated (for example, where KQI data is only available for a cluster of base stations, the corresponding KPI data is clustered to the same level of aggregation) and mapped to a common time scale and temporal granularity.

Additionally, at block 701, abnormal KQIs are defined for training and generating fingerprints. Table 3 below provides a non-limiting set of example anomalous KQIs for which fingerprints may be generated at block 701.

KQIs, for example, an anomalous KQI defined as "SIPDCRatio>0.6% and RTPGapRatio>0.125%."

According to certain embodiments, training, or developing fingerprints associating anomalous KQIs with relevant sets of KPIs at block 701 proceeds in three basic phases. First, relevant KPIs are selected as features for training an association rule mining algorithm. Second KPI items are created by binning the selected KPIs providing the antecedents of association rules. Third, the selected KPIs are provided to a frequent pattern (FP) grown association rule mining algorithm which takes as inputs, the KPI items, and outputs association rules associating anomalous KQIs with KPI items.

According to some embodiments, selecting KPIs as features refers to the process of selecting, from the potentially hundreds of KPIs available, a subset of KPIs which, either alone or in combination with each other provide a comparatively high degree of predictive value to a particular anomalous KQI. Multiple approaches for selecting KPI features are possible and within the disclosed scope of this disclosure. The below-described approaches may be used singly, or in combination with one another. According to one approach, the intuition and experience of technicians and skilled operators may be used to pre-select certain KPIs which are understood as being diagnostically relevant to a particular anomalous KQI. According to another approach, KPI features can be selected based on trial and error, based on the observed predictiveness of the association rules so generated.

According to a third approach, KPI features can be selected according to the following heuristic method, wherein the performance of a rule associating the predictive performance of a given KPI (or synthetic KPI) is specified according to one of Equations 5a or 5b, below:

$$\{KPI > \text{thresh} \rightarrow AN_{KQI} = 1\} \qquad \text{Equation 5a}$$

$$\{KPI < \text{thresh} \rightarrow AN_{KQI} = 1\} \qquad \text{Equation 5b}$$

By varying the value of the threshold thresh and observing the incidence with which a given KPI provides, with a specified degree of confidence (for example >60%), a suf-

TABLE 3

| Anomalous KQI | Defined As |
|---|---|
| SIPDCRatio > 0.6% | $SIPDCRatio = \dfrac{\text{Adjusted\_SIP\_DC\_Rate\_N}}{\text{Adjusted\_SIP\_DC\_Rate\_D}}$ <br><br> Where Adjusted_SIP_DC_Rate_N is a metric of a number of degraded calls in a reporting period and Adjusted_SIP_DC_Rate_D is a metric of a total number of calls in a reporting period. |
| RTPGapRatio > 0.125% | $RTPGapRatio = \dfrac{\text{RTP\_Gap\_Duration\_Ratio\_Avg \% } n}{\text{RTP\_Gap\_Duration\_Ratio\_Avg \% } d}$ <br><br> Where RTP_Gap_Duration_Ratio_Avg % n is a metric of the fraction of packets with timestamp gaps and RTP_Gap_Duration_Ratio_Avg % d is a metric of the total number of packets. |
| VoLTERTPGapRatio > 1% | Same formula as RTPGapRatio, except only for VoLTE packets. |

According to various embodiments, other threshold values (for example, 0.6% for SIPDCRatio) are possible and within the contemplated scope of this disclosure. Similarly, according to some embodiments, anomalous KQIs may be defined based on combinations of individual anomalous ficiently high hit ratio of incidence (for example, greater than 1 or 2%) with the anomalous KQI of interest, that particular KPI is included within the KPI feature set.

Having selected a corpus of KPI features, the next phase of fingerprint generation is creating KPI items. As used in this disclosure, the expression "KPI item" encompasses a pairing of a selected KPI feature with a defined threshold for abnormality, such that instances of the selected KPI satisfying the defined threshold are pulled or "binned" for training an association rules model. In this way, certain embodiments according to this disclosure provide a set of association rules linking anomalous KQIs with anomalous KPIs, thereby enhancing the speed and efficiency with which root cause analyses (RCAs) may be performed. According to some embodiments, the thresholds for binning instances of KPI data may be set manually, based on domain knowledge (for example, an experience-based understanding of where an abnormal value falls). Table 4, below, provides a non-exhaustive set of example KPI items according to various embodiments of this disclosure.

TABLE 4

| Feature | Antecedent Binning Threshold |
|---|---|
| ConnReEstabRate | Hourly percentile >90% ile |
| RelFailNbr_CpCcInteraction | >0 |
| RelActive_EccbRadioLinkFailure | >0 |
| RelActive_EccbArqMaxReTransmission | >0 |
| CallDropQci_EccbTot | >10 |
| RelActive_EccbTmoutRrcConnectionReestablish | >0 |
| RelActive_EccbTmoutRrcConnectionReconfig | >0 |
| RelActive_MmeInitErabRelease | >0 |
| RelActive_ResetRelease | >0 |
| RoHCDecompFailRate | >500 |
| RelActive_ErabRelease | >0 |
| [0x035D]Ecc_RadioLinkFailurebyRRE | >50 |
| ConnDropRate | Hourly percentile >90% ile |
| RssiOverPathAvg | Hourly percentile >90% ile |
| ConnNoAvg | Hourly percentile >90% ile |
| CoverageHole | >0.1 |
| TotQCI1PrbULUsed | >30000 |
| TotTtibPrbULAvg | >2 |
| TotTtibPrbULUsed | >10000 |
| TtibNoMax | >2 |
| TtibActFailRate | >0 |
| TtibDeactFailRate | >0 |
| SumRelActive | >200 |
| ULVoLTEHARQInitFailRate | >2 |
| ULVoLTEHARQFailRate | >0 |
| VoLTEDropRate | >0.25 |
| TimeAdvanceRatio | Hourly percentile >90% ile |
| CellEdgeSINRPreComp5 | <0 |
| CellEdgeSINRPreComp20 | <0 |
| VoLTEIntraHoTimeAvg | >50 |
| VoLTEX2HoTimeAvg | >50 |
| VoLTES1HoTimeAvg | >50 |
| TooLateHoRlfAfterTriggering | >0 |
| RruCceAllocationFailULAvg | >6 |
| HwcReestablishRlfAfterTriggering | >0.5 |
| UEActiveULAvg | Hourly percentile >90% ile |
| ULTransmissionNackedRetrans | >100000 |
| RoHCDecompFailRate | >500 |
| RelActive | >1 |

Depending on the nature of the network (i.e., the frequency with which upgrades are implemented, and the extent to which the network is evolving in ways that a domain knowledge expertise becomes less readily applicable) manual definition of antecedent binning thresholds can become increasingly inefficient.

Put differently, the task of selecting binned thresholds associated with anomalous KQIs is a combinatorial problem with a large state space, and as such, may be very difficult to solve. This combinatorial problem may be expressed according to Equation 6, below:

$$\max_{T=\{t_1^1,\ldots,t_K^1,\ldots,t_1^n,\ldots,t_K^n\}} H(T) \text{ s.t. } C(T) > c \quad \text{Equation 6}$$

Where H is overall hit ratio for a rule T associating KPIs 1-K, and C is minimum rule confidence for rule T.

In certain embodiments according to this disclosure, the fingerprints generated at block 701 are rules defined by an FP growth-based rule mining algorithm, whose antecedents are binned KPIs and antecedents are anomalous KQIs. In plain terms, for a given anomaly (for example, an anomalous KQI or KPI value), the fingerprint comprises a set of n KPIs which correspond to the anomalous KQI at a threshold rate. In some embodiments, binning thresholds can be automatically and iteratively tuned according to the following antecedent KPI binning algorithm.

For KPI features where a high value of the KPI are considered degraded (and thus binned) based on domain knowledge, a basic rule expressing the association between the degraded KPI and the anomalous KQI may be defined by Equation 7a, below:

$$KPI > \text{thresh} \rightarrow A_{KQI} = 1 \quad \text{Equation 7a}$$

For the counterpart case, where a high value of a selected KPI is considered degraded (and thus binned) based on domain knowledge, the basic rule expressing the association between the degraded KPI and the anomalous KQI may be given by Equation 6b, below:

$$KPI < \text{thresh} A_{KQI} = 1 \quad \text{Equation 7b}$$

For a given set of t KPI items associated with anomaly detection output $A_{KQI}$, there may be a minimum hit ratio of basic rules h, a number of levels $\ell$ for which multi-binning is to be done and set of binning thresholds $\kappa_t$ for $t=1,\ldots,\ell$.

According to various embodiments, for each basic rule as given by Equations 6a and 6b, the basic rule is evaluated for different values of threshold 'thresh' by computing a hit ratio and rule confidence value of each basic rule. The values of thresholds 'thresh' may then be filtered to only include rules having a hit ratio above a specified value (for example, 6%). Such filtering may help avoid overfitting for small rule support.

Next, for $t=1$ to $\ell$: the threshold $T_t$ is chosen to maximize the hit ratio. Note that larger the value of $K_t$ the higher the hit ratio of the basic rule, and the smaller the basic rule confidence and smaller the threshold $T_t$. The input thresholds $\kappa_t$ serve to tune heavy, medium or small degradation of KPI item for different binning levels t. The KPI items generated based on the above-described method may be given as: $\{T_t > KPI > T_{t-1}\}$ for $t=2,\ldots,\ell$.

By the above-described method, a set of KPI items for each KPI with $\ell$ binning may be automatically generated.

Alternatively, or additionally, in some embodiments, automatic binning of KPI data may be performed by picking the top r% degraded samples of each KPI feature as items. Subsequently, the samples between s% and r% of the top degraded KPI feature as picked as items, and then iterating the process across each of the selected KPIs.

According to various embodiments, the third phase of fingerprint generation at block 701 comprises providing the anomalous KQIs and the KPI items to a rule mining algorithm (for example, a frequent pattern ("FP") growth rule mining algorithm) to obtain association rules, or "fingerprints" associating anomalous KQIs (or, if desired, anomalous KPIs) with KPI items. As used in this disclosure, the expression "association rule" encompasses an implication which can be expressed as {A}⇒{B }, wherein event A implies event B. In this example, Event A, is referred to as the antecedent of the association rule, while Event B, is referred to as the consequent of the association rule. Association rules mining algorithms seek to identify rules correlating co-occurrences of different events for identifying cause-and-effect relations. In the context of a root cause analysis of a wireless network, Event A may comprise a reduced end-user signal to inference ratio, while Event B could be an increased number of VoLTE muting events. In this example, rule {A}⇒{B } connotes that poor channel conditions imply high number of VoLTE muting events (i.e., degraded voice quality).

According to certain embodiments, the rules or "fingerprints" generated at block 701 take the general form $\{KPI_1<T_1, KPI_2<T_2, \ldots KPI_n<T_n\} \Rightarrow \{AN_{KQI}=1\}$. The antecedent KPIs are comprised of KPI items generated by binning selected KPIs. The consequent $\{AN_{KQI}=1\}$ is derived by identifying anomalies detected as described herein. In this example, KPI items may be represented as $\{KPI_i<T_i\}$ and the example rule shown above has n co-occurring items which define an itemset. In this illustrative example, $\{KPI_1<T_1, KPI_2<T_2, \ldots KPI_n<T_n, AN_{KQI}=1\}$ represents the itemset with anomaly detection and $\{KPI_1<T_1, KPI_2<T_2, \ldots KPI_n<T_n\}$ represents an itemset without the anomaly detection $AN_{KQI}=1$. The number of samples in the itemset without anomaly detection outcome $AN_{KQI}=1$ is larger than the itemset with this item included in the itemset. The comma in the itemset notation can be interpreted as an AND operation between individual items.

According to certain embodiments, the accuracy of rules generated by the association rule are evaluated and optimized based on three metrics: confidence, hit ratio and lift. As used in this disclosure, confidence encompasses a conditional probability $P(B|A)$ that event B occurs conditioned on event A. As used in this disclosure, the expression "hit ratio" encompasses a quantification of a conditional probability $P(A|B)$ of event A conditioned on event B. Further, as used in this disclosure, the expression "lift" correlates to a ratio $P(A \cap B)/P(A)P(B)$, wherein lift values>1 indicate that event A is positively correlated with event B.

According to various embodiments, at block 701 the anomalous KQIs and KPIs are provided as inputs to a rule mining algorithm (for example, a rapid association rule mining "RARM" algorithm) to obtain as an output, as set of association rules with determined confidence and lift values. Specifically, in some embodiments, an initial dataset D is provided to the rule mining algorithm, wherein the columns of initial dataset D comprise KPI items reported at a common level of granularity, minimum support Tsupp, minimum Tlift, minimum confidence Tconf, total number of antecedent KPIs nKPI. Dataset D also further comprises a column, $AN_{KQI}$, containing a label whether each row is anomalous or not.

In some embodiments, as an initial step, all of the rows of D which are not labeled as containing an anomaly are removed, leaving reduced dataset $D_a$. Next, an item header table is constructed by sorting each item in descending order according to the frequency of its occurrence in the dataset Da. According to certain embodiments, an FP-Growth tree using the item header by mapping each transaction onto a path over the tree. Each node in the tree corresponds to an item and has a counter. Subsequently, itemsets whose counter value satisfies a threshold condition, and which meet the following FP-Growth tree conditions: 1) the itemset contains $AN_{KQI}=1$ item, 2) the itemset contains at least one KPI, 3) the support exceeds a given threshold and 4) total number of KPI items in the itemset<nKPI, are extracted.

For each extracted itemset, the rules are evaluated for lift and confidence as follows. Remove the $AN_{KQI}=1$ from this itemset to obtain a KPI itemset. Now the itemset is supported by a larger number of samples from database D. The expanded itemset is then provided to the previously generated FP-Growth tree.

For each rule of the itemset, the confidence of rule is calculated as supp(itemset)/supp(KPIitemset). Calculate the lift of this rule by dividing the confidence by the unconditional probability of the consequent. If the lift is larger than the Tlift and confidence larger than Tconf, the rule is kept. Otherwise, the rule is discarded. The remaining rules are kept as fingerprints indicating an association between an anomalous KQI and sets of KPIs having a specified degree of confidence and lift.

Referring to the non-limiting example of FIG. 7, having generated fingerprints associating anomalous KQIs with analytically relevant combinations of binned KPIs, pipeline 700 proceeds to block 703, wherein operation switches from training to implementation. At block 703, the computing platform(s) implementing pipeline 700 receives a set of KQI data and detects one or more KQI values corresponding to a range of KQI values that were identified and defined as being anomalous at block 703.

According to various embodiments, at block 705, the detected anomalous KQI is compared against fingerprints generated at block 701 to identify one or more generated fingerprints having the same anomalous KQI. In some embodiments, for example, where a single anomalous KQI is associated with multiple fingerprints, as part of the process of fingerprint matching, available KPI data is also compared against the KPIs in an initial set of fingerprints to improve the fingerprint match. Finally at block 707, a set of root cause candidates comprising the KPIs of the rule exhibiting the best confidence and lift values is output.

Figure 8:
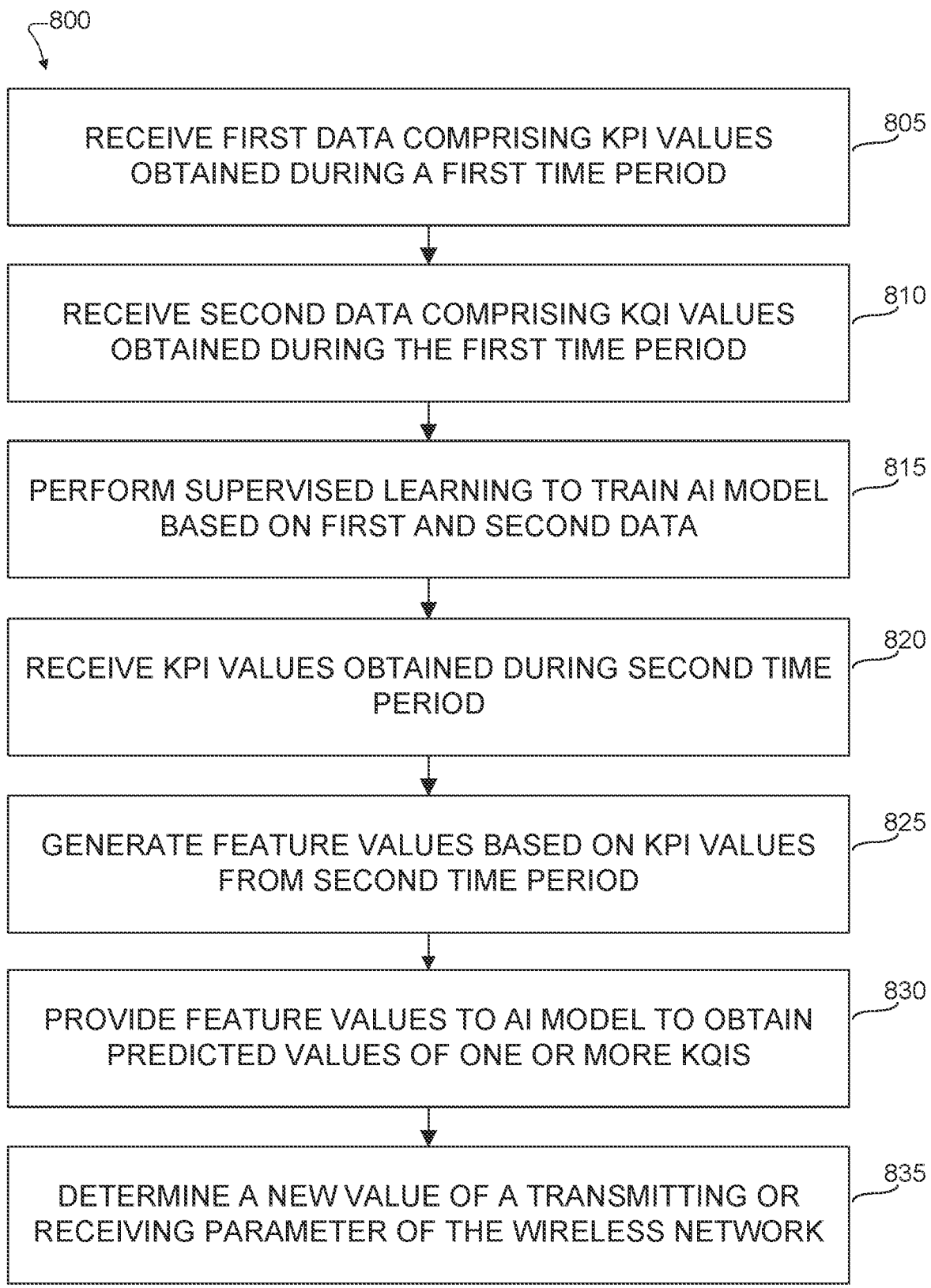
FIG. 8 illustrates operations of an example method 800 for obtaining estimated KQI values from available KPI values according to various embodiments of this disclosure.

FIG. 8 illustrates operations of an example method 800 for obtaining estimated KQI values from available KPI values according to various embodiments of this disclosure. The operations described with reference to FIG. 8 may be performed at any suitably configured computing platform (for example, a server comprising a part of a 5G core network, a device embodying the architecture described with reference to FIG. 3 of this disclosure, or network management apparatus 900 described with reference to FIG. 9).

At operations 805 and 810, the computing platform receives first data comprising KPI values over a first time period and KQI values obtained during the first time period. According to various embodiments, the KPI and KQI values are provided from vendor-specific and/or network-specific data sources such as operations support system 411, network analyzer 413 and/or VOMA analyzer 415 in FIG. 4. Further, in some embodiments, at operations 805 and 810, the computing platform pre-processes one or both of the obtained KQI and KPI data to harmonize the temporal granularity and aggregation level of the training data, such that the KPI and KQI data are on equivalent time and network level scales. In various embodiments, at operation 805, the processing platform further generates synthetic KPIs, such as described with reference to Table 1 of this disclosure.

According to various embodiments, at operation 815, the KPI and KQI data obtained at operations 805 and 810 is provided to train one or more machine learning models (for example, a neural network or random forest model, or estimation model f(.) in FIG. 6) to generate estimated KQI values based on KPI features.

Once trained, the estimation model can be re-applied for predicting and backfilling missing KQI data for network optimization. According to various embodiments, at operation 820, the computing platform obtains KPI values from a second time period (for example, the KPI values received at block 609 of FIG. 6). According to various embodiments, the KPI values received during 820 are pre-processed to conform to the temporal granularity and network node aggregation levels of the training data, in particular, the KQI training data.

At operation 825, the processing platform generates feature values based on KPI data obtained at operation 820. According to various embodiments, generating feature values comprises selecting the KPI values which map to features used by the model trained at operation 815. In some embodiments, generating feature values further comprises determining values of synthetic KPIs based on the obtained KPI data.

According to some embodiments, at operation 830, the generated feature values are provided to the model trained at operation 815 to obtain one or more predicted KQI values. At operation 835, the computing platform determines an updated value of a transmitting or receiving parameter of the wireless network based on the predicted KQI values. Examples of transmitting/receiving parameters include, without limitation, site acceptance parameters, and whether to keep a particular network component online.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Figure 9:
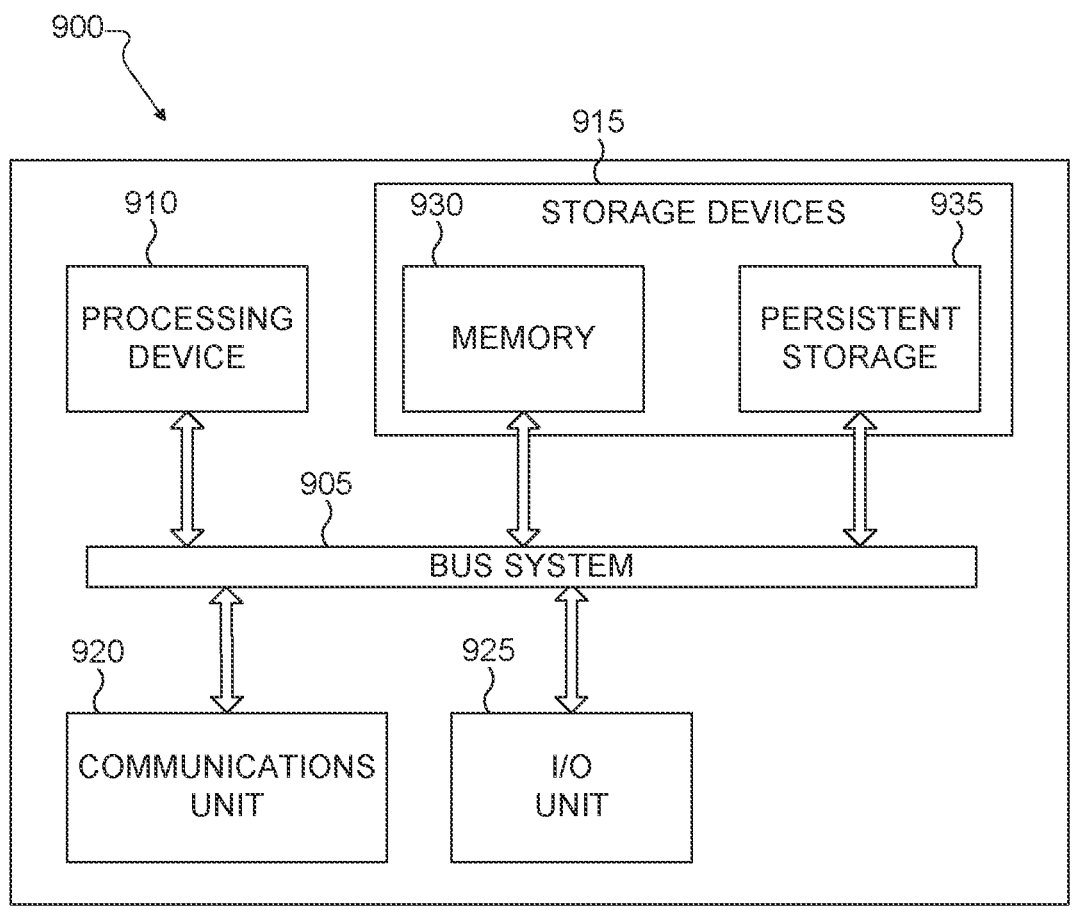
FIG. 9 illustrates an example of a network management apparatus according to various embodiments of this disclosure.

FIG. 9 illustrates an example of a network management apparatus (also known as an NME) 900 according to certain embodiments of this disclosure. Depending on embodiments, NME 900 can be implemented as part of a base station (for example, base station 401 in FIG. 4). In some embodiments, NME 900 can be implemented as part of a core network (for example, network 417 in FIG. 4) The embodiment of NME 900 shown in FIG. 9 is for illustration only and other embodiments could be used without departing from the scope of the present disclosure. According to certain embodiments, NME 900 is communicatively connected to base stations of a wireless network and provide user plane controls and handle network management operations.

In the example shown in FIG. 9, NME 900 includes a bus system 905, which supports communication between at least one processing device 910, at least one storage device 915, at least one communications unit 920, and at least one input/output (I/O) unit 925.

The processing device 910 executes instructions that may be loaded into a memory 930. The processing device 910 may include any suitable number(s) and type(s) of processors or other devices in any suitable arrangement. Example types of processing devices 910 include microprocessors, microcontrollers, digital signal processors, field programmable gate arrays, application specific integrated circuits, and discrete circuitry.

The memory 930 and a persistent storage 935 are examples of storage devices 915, which represent any structure(s) capable of storing and facilitating retrieval of information (such as data, program code, and/or other suitable information on a temporary or permanent basis). The memory 930 may represent a random-access memory or any other suitable volatile or non-volatile storage device(s). The persistent storage 935 may contain one or more components or devices supporting longer-term storage of data, such as a ready only memory, hard drive, Flash memory, or optical disc.

The communications unit 920 supports communications with other systems or devices. For example, the communications unit 920 could include a network interface card or a wireless transceiver facilitating communications over a network (for example, network 417 in FIG. 4). The communications unit 920 may support communications through any suitable physical or wireless communication link(s).

The I/O unit 925 allows for input and output of data. For example, the I/O unit 925 may provide a connection for user input through a keyboard, mouse, keypad, touchscreen, or other suitable input device. The I/O unit 925 may also send output to a display, printer, or other suitable output device. While network management apparatus 900 has been described with reference to a standalone device, embodiments according to this disclosure are not so limited, and network management apparatus 900 could also be embodied in whole, or in part, on a cloud or virtualized computing platform.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A network management apparatus of a wireless network, comprising:
a network interface;
a processor; and
a memory, containing instructions, which when executed by the processor, cause the apparatus to:
receive, via the network interface, first data comprising values of key performance indicators (KPIs) obtained from elements of the wireless network for a first time period,
receive, via the network interface, second data comprising values of key quality indicators (KQIs) for the first time period, wherein the KQIs comprise metrics of end-user quality of service (QOS) of the wireless network,
perform supervised learning to train an artificial intelligence (AI) model based on the first and second data, wherein features of the AI model are based on KPIs available from the elements of the wireless network, and outputs of the AI model comprise values of one or more KQIs,
determine a set of KPIs associated with an anomalous indicator satisfying a relevance threshold, wherein the anomalous indicator is at least one of an anomalous KPI of a first type or an anomalous KQI of a second type, receive, via the network interface, third data comprising values of KQIs obtained during a second time period, the third data comprising the anomalous KQI of the second type, identify the anomalous KQI of the second type in the third data, and output, via the network interface, the determined set of KPIs associated with the anomalous KQI of the second type.

2. The network management apparatus of claim 1, wherein the second data comprises KQIs of a voice-over-long-term-evolution (VOLTE) service.

3. The network management apparatus of claim 1, wherein the memory further comprises instructions, which when executed by the processor, cause the apparatus to:

receive, via the network interface, values of the KPIs obtained from the elements of the wireless network for a third time period, generate feature values based on the KPIs obtained from the elements of the wireless network for the third time period, provide the generated feature values to the AI model to obtain predicted values of one or more KQIs, and determine a new value of a transmitting or receiving parameter of at least one of the elements of the wireless network based in part on the predicted values of the one or more KQIs.

4. The network management apparatus of claim 3, wherein the memory further comprises instructions, which, when executed by the processor, cause the apparatus to:

receive, via the network interface, values of KQIs from a fourth time period subsequent to the third time period, and determine the new value of the transmitting or receiving parameter of the at least one element of the wireless network based in part on the values of KQIs from the fourth time period.

5. The network management apparatus of claim 1, wherein the memory contains instructions, which, when executed by the processor, cause the apparatus to determine the set of KPIs associated with the anomalous KQI by applying an antecedent KPI binning algorithm.

6. The network management apparatus of claim 1, wherein the AI model comprises a random forest model or a neural network.

7. The network management apparatus of claim 1, wherein the KPIs comprise at least one of: a throughput metric, a signal-to-noise-ratio, or a number of active users connected per cell.

8. A method of operating a network management apparatus of a wireless network, the method comprising:

receiving, via a network interface, first data comprising values of key performance indicators (KPIs) obtained from elements of the wireless network for a first time period;

receiving, via the network interface, second data comprising values of key quality indicators (KQIs) for the first time period, wherein the KQIs comprise metrics of end-user quality of service (QOS) of the wireless network;

performing supervised learning to train an artificial intelligence (AI) model based on the first and second data, wherein features of the AI model are based on KPIs available from elements of the wireless network, and outputs of the AI model comprise values of one or more KQIs;

determining a set of KPIs associated with an anomalous indicator satisfying a relevance threshold, wherein the anomalous indicator is at least one of an anomalous KPI of a first type or an anomalous KQI of a second type;

receiving, via the network interface, third data comprising values of KQIs obtained during a second time period, the third data comprising the anomalous KQI of the second type;

identifying the anomalous KQI of the second type in the third data; and outputting, via the network interface, the determined set of KPIs associated with the anomalous KQI of the second type.

9. The method of claim 8, wherein the second data comprises KQIs of a voice-over-long-term-evolution (VOLTE) service.

10. The method of claim 8, further comprising:

receiving, via the network interface, values of the KPIs obtained from the elements of the wireless network for a third time period;

generating feature values based on the KPIs obtained from the elements of the wireless network for the third time period;

providing the generated feature values to the AI model to obtain predicted values of one or more KQIs; and determining a new value of a transmitting or receiving parameter of at least one of the elements of the wireless network based in part on the predicted values of the one or more KQIs.

11. The method of claim 10, further comprising:

receiving, via the network interface, values of KQIs from a fourth time period subsequent to the third time period; and determining the new value of the transmitting or receiving parameter of the at least one element of the wireless network based in part on the values of KQIs from the fourth time period.

12. The method of claim 8, further comprising determining the set of KPIs associated with the anomalous KQI by applying an antecedent KPI binning algorithm.

13. The method of claim 8, wherein the AI model comprises a random forest model or a neural network.

14. The method of claim 8, wherein the KPIs comprise at least one of: a throughput metric, a signal-to-noise-ratio, or a number of active users connected per cell.

15. A non-transitory computer-readable medium containing instructions, which, when executed by a processor, cause an apparatus to:

receive, via a network interface of the apparatus, first data comprising values of key performance indicators (KPIs) obtained from elements of a wireless network for a first time period;

receive, via the network interface, second data comprising values of key quality indicators (KQIs) for the first time period, wherein the KQIs comprise metrics of end-user quality of service (QOS) of the wireless network;

perform supervised learning to train an artificial intelligence (AI) model based on the first and second data, wherein features of the AI model are based on KPIs available from elements of the wireless network, and outputs of the AI model comprise values of one or more KQIs;

determine a set of KPIs associated with an anomalous indicator satisfying a relevance threshold, wherein the anomalous indicator is at least one of an anomalous KPI of a first type or an anomalous KOI of a second type;

receive, via the network interface, third data comprising values of KQIs obtained during a second time period, the third data comprising the anomalous KQI of the second type;

identify the anomalous KQI of the second type in the third data; and outputt, via the network interface, the determined set of KPIs associated with the anomalous KQI of the second type.

16. The non-transitory computer-readable medium of claim 15, wherein the second data comprises KQIs of a voice-over-long-term-evolution (VOLTE) service.

17. The non-transitory computer-readable medium of claim 15, containing further instructions, which when executed by the processor, cause the apparatus to:

receive, via the network interface of the apparatus, values of the KPIs obtained from the elements of the wireless network for a third time period;

generate feature values based on the KPIs obtained from the elements of the wireless network for the third time period;

provide the generated feature values to the AI model to obtain predicted values of one or more KQIs; and determine a new value of a transmitting or receiving parameter of at least one of the elements of the wireless network based in part on the predicted values of the one or more KQIs.

18. The non-transitory computer-readable medium of claim 17, containing further instructions, which, when executed by the processor, cause the apparatus to:

receive, via the network interface of the apparatus, values of KQIs from a fourth time period subsequent to the third time period, and determine the new value of the transmitting or receiving parameter of the at least one element of the wireless network based in part on the values of KQIs from the fourth time period.

19. The non-transitory computer-readable medium of claim 15, containing further instructions, which, when executed by the processor, cause the apparatus to determine the set of KPIs associated with the anomalous KQI by applying an antecedent KPI binning algorithm.

20. The non-transitory computer-readable medium of claim 15, wherein the AI model comprises a random forest model or a neural network.

* * * * *